United States Patent
Ranjbar et al.

(10) Patent No.: US 11,483,052 B2
(45) Date of Patent: Oct. 25, 2022

(54) AOA/AOD CALCULATIONS IN MULTIPATH FADING ENVIRONMENTS

(71) Applicant: SHENZHEN GOODIX TECHNOLOGY CO., LTD., Shenzhen (CN)

(72) Inventors: Mohammad Ranjbar, San Diego, CA (US); Amir Dezfooliyan, San Diego, CA (US); Waleed Younis, San Diego, CA (US)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 180 days.

(21) Appl. No.: 17/006,835

(22) Filed: Aug. 30, 2020

(65) Prior Publication Data

US 2022/0069886 A1   Mar. 3, 2022

(51) Int. Cl.

| | |
|---|---|
| *H04B 7/08* | (2006.01) |
| *H04B 7/0413* | (2017.01) |
| *H04B 7/06* | (2006.01) |
| *G01S 3/48* | (2006.01) |
| *G01S 3/74* | (2006.01) |

(52) U.S. Cl.
CPC .......... *H04B 7/086* (2013.01); *G01S 3/48* (2013.01); *G01S 3/74* (2013.01); *H04B 7/0413* (2013.01); *H04B 7/0617* (2013.01)

(58) Field of Classification Search
CPC .................................. G01S 3/48; G01S 3/74

USPC ................................................. 342/350, 356
See application file for complete search history.

(56) References Cited

U.S. PATENT DOCUMENTS

| | | | |
|---|---|---|---|
| 2015/0201305 A1* | 7/2015 | Edge .................. | H04W 4/021 455/456.3 |
| 2017/0212204 A1 | 7/2017 | Amizur et al. | |
| 2018/0084386 A1 | 3/2018 | Shpak | |
| 2018/0348357 A1 | 12/2018 | Pandey et al. | |

FOREIGN PATENT DOCUMENTS

| | | |
|---|---|---|
| CN | 110418974 A | 11/2019 |
| CN | 110446939 A | 11/2019 |

* cited by examiner

*Primary Examiner* — Bo Fan
(74) *Attorney, Agent, or Firm* — Kilpatrick Townsend & Stockton LLP (57) ABSTRACT

A receiver is disclosed. The receiver includes one or more antennas receiving signals from a transmitter including one or more antennas, and at least one RF chain generating digital samples based on the received signals. Either A) the signals are transmitted by a single antenna of the transmitter and are received by multiple antennas of the receiver, or B) the signals are transmitted by multiple antennas of the transmitter and are received by a single antenna of the receiver. The receiver also includes a controller determining a plurality of groups of digital samples to use for calculating estimates of an AoA or AoD of the received signals, calculate estimates of AoA or AoD based on the groups of digital samples, select a subset of the estimates, and calculate a measured AoA or AoD based on the selected subset of estimates.

20 Claims, 5 Drawing Sheets

AOA/AOD CALCULATIONS IN MULTIPATH FADING ENVIRONMENTS

TECHNICAL FIELD

The subject matter described herein relates to determining Angle of Arrival (AoA) or Angle of Departure (AoD), and more particularly to determining AoA or AoD accurately in the presence of multipath fading.

BACKGROUND

Individual transmitted RF signals are frequently received at receiver antennas after traveling along multiple transmission paths from a transmitter to the receiver, for example, because of reflections of the transmitted signals. Because each of the transmission paths may be terminate at the receiver from a different angle, AoA or AoD calculations are typically corrupted by signals having traversed transmission paths other than the predominant transmission path. Techniques for accurately calculating AoA or AoD in the presence of multipath transmissions are needed in the art.

SUMMARY

One inventive aspect is a receiver circuit, including one or more receiver antennas configured to receive a plurality of signals transmitted from a transmitter circuit including one or more transmit antennas, and at least one RF chain configured to generate a plurality of digital samples based on the received signals, where one of A) the signals are transmitted by a single transmit antenna of the transmitter circuit and are received by a plurality of receive antennas of the receiver circuit, and B) the signals are transmitted by a plurality of transmit antennas of the transmitter circuit and are received by a single receive antenna of the receiver circuit. The receiver circuit also includes a controller configured to determine a plurality of groups of digital samples to use for calculating estimates of an angle of arrival (AoA) or an angle of departure (AoD) of the received signals, calculate a plurality estimates of AoA or AoD based on the determined groups of digital samples, select a subset of the calculated estimates of AoA or AoD, and calculate a measured AoA or AoD based on the selected subset of estimates of AoA or AoD.

In some embodiments, the controller is configured to determine each particular group of digital samples based on characteristics of a corresponding set of receive antennas or set of transmit antennas used for generating the particular group of digital samples.

In some embodiments, a first set of receive or transmit antennas corresponding with a first group of digital samples includes a first particular antenna, and a second set of receive or transmit antennas corresponding with a second group of digital samples includes the first particular antenna.

In some embodiments, each set of receive or transmit antennas has no other antennas therebetween.

In some embodiments, at least one set of receive or transmit antennas has one or more other antennas therebetween, where the one or more other antennas are not included in the at least one set.

In some embodiments, the controller is configured to calculate an estimate of AoA or AoD based on each of the groups of digital samples.

In some embodiments, the controller is configured to select the subset of calculated estimates of AoA or AoD using a clustering algorithm.

In some embodiments, one of A) each digital sample is one of a number of digital samples generated based on the signals transmitted by one of the transmit antennas of the transmitter circuit over a period of time, and B) each digital sample is one of a number of digital samples generated based on the signals received by one of the receiver antennas over a period of time.

In some embodiments, the signals are transmitted by the single transmit antenna of the transmitter circuit and are received by the plurality of receive antennas of the receiver circuit.

In some embodiments, the signals are transmitted by the plurality of transmit antennas of the transmitter circuit and are received by the single receive antenna of the receiver circuit.

Another inventive aspect is a method of using a receiver circuit, the method including at one or more receiver antennas of the receiver circuit, receiving a plurality of signals transmitted from a transmitter circuit with one or more transmit antennas, and, with at least one RF chain, generating a plurality of digital samples based on the received signals, where one of A) the signals are transmitted by a single transmit antenna of the transmitter circuit and are received by a plurality of receive antennas of the receiver circuit, and B) the signals are transmitted by a plurality of transmit antennas of the transmitter circuit and are received by a single receive antenna of the receiver circuit. The method also includes, with a controller determining a plurality of groups of digital samples to use for calculating estimates of an angle of arrival (AoA) or an angle of departure (AoD) of the received signals, calculating a plurality estimates of AoA or AoD based on the determined groups of digital samples, selecting a subset of the calculated estimates of AoA or AoD, and calculating a measured AoA or AoD based on the selected subset of estimates of AoA or AoD.

In some embodiments, the method also includes, with the controller, determining each particular group of digital samples based on characteristics of a corresponding set of receive antennas or set of transmit antennas used for generating the particular group of digital samples.

In some embodiments, a first set of receive or transmit antennas corresponding with a first group of digital samples includes a first particular antenna, and a second set of receive or transmit antennas corresponding with a second group of digital samples includes the first particular antenna.

In some embodiments, each set of receive or transmit antennas has no other antennas therebetween.

In some embodiments, at least one set of receive or transmit antennas has one or more other antennas therebetween, where the one or more other antennas are not included in the at least one set.

In some embodiments, the method also includes, with the controller, calculating an estimate of AoA or AoD based on each of the groups of digital samples.

In some embodiments, the method also includes, with the controller, selecting the subset of calculated estimates of AoA or AoD using a clustering algorithm.

In some embodiments, one of A) each digital sample is one of a number of digital samples generated based on information transmitted by one of the transmit antennas of the transmitter circuit over a period of time, and B) each digital sample is one of a number of digital samples generated based on information received by one of the receiver antennas over a period of time.

In some embodiments, the signals are transmitted by the single transmit antenna of the transmitter circuit and are received by the plurality of receive antennas of the receiver circuit.

In some embodiments, the signals are transmitted by the plurality of transmit antennas of the transmitter circuit and are received by the single receive antenna of the receiver circuit.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations.

When practical, similar reference numbers denote similar structures, features, or elements.

DETAILED DESCRIPTION

Particular embodiments of the invention are illustrated herein in conjunction with the drawings. Particular embodiments of the invention are illustrated herein in conjunction with the drawings.

Various details are set forth herein as they relate to certain embodiments. However, the invention can also be implemented in ways which are different from those described herein. Modifications can be made to the discussed embodiments by those skilled in the art without departing from the invention. Therefore, the invention is not limited to particular embodiments disclosed herein.

Figure 1A:
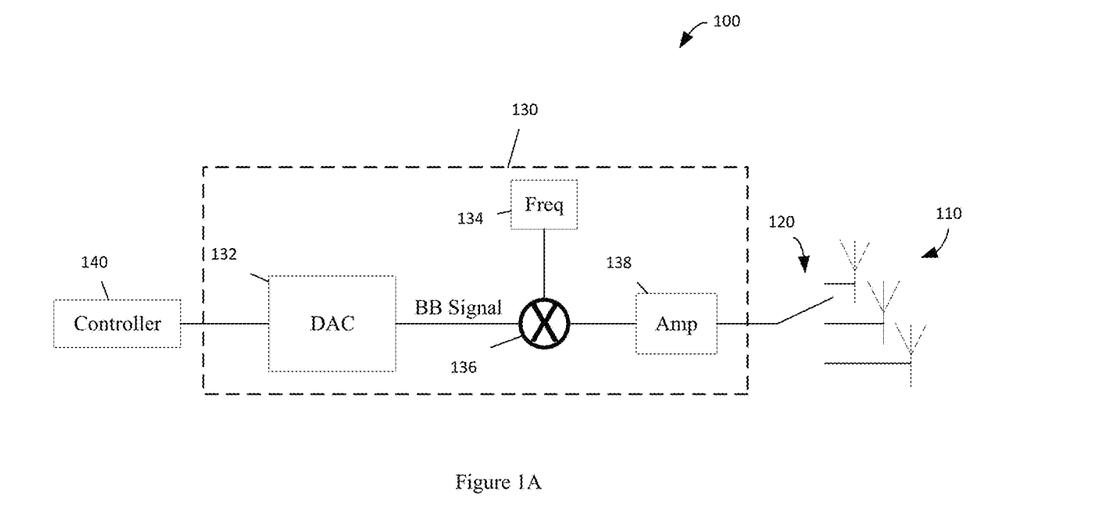
FIG. 1A is a schematic diagram of an embodiment of a transmitter circuit according to an embodiment.
Figure 1B:
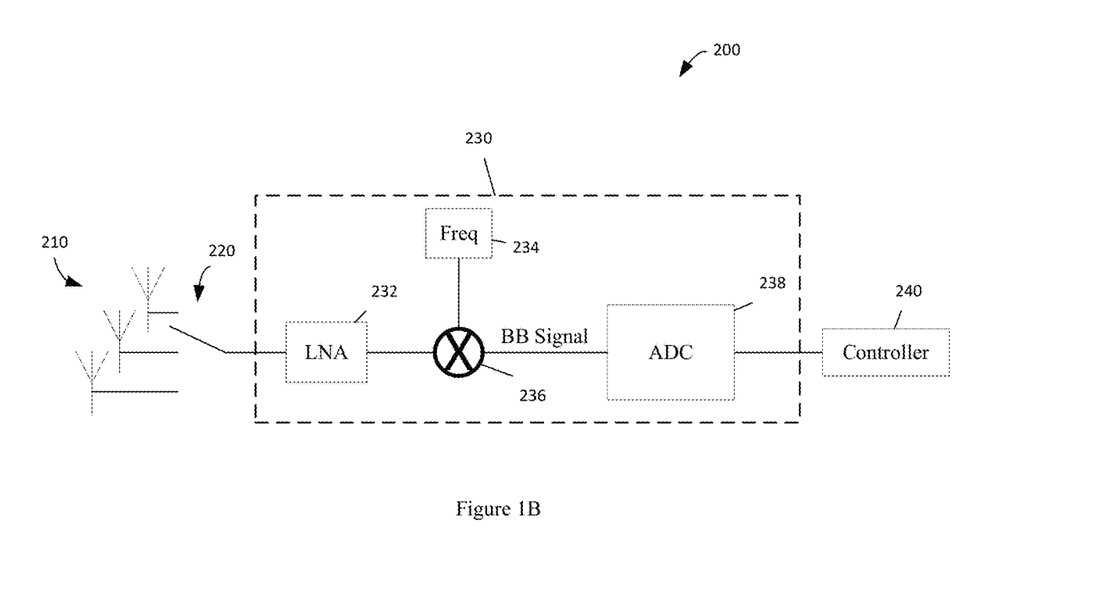
FIG. 1B is a schematic diagram of an embodiment of a receiver circuit according to an embodiment.
Figure 2A:
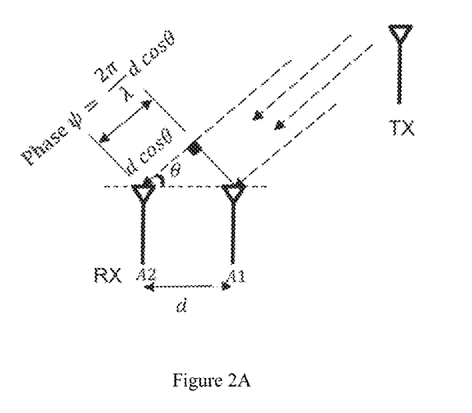
FIG. 2A is a schematic diagram of two antenna systems illustrating AoA.
Figure 2B:
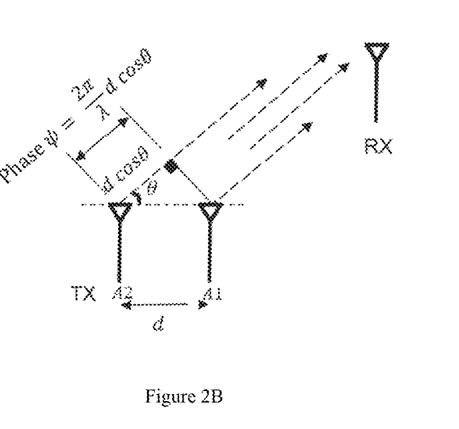
FIG. 2B is a schematic diagram of two antenna systems illustrating AoD.
Figure 3:
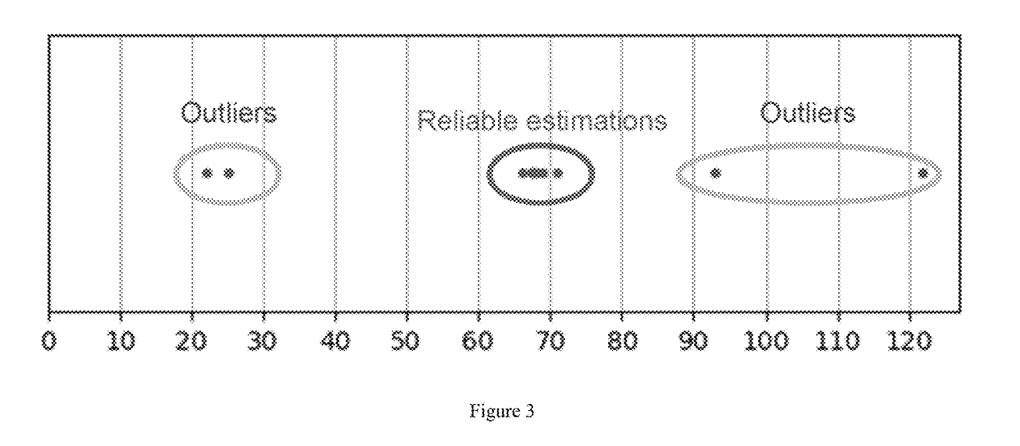
FIG. 3 is a graph illustrating multiple AoA or AoD estimations, where some of the estimations are made based on alternate transmission paths.
Figure 4:
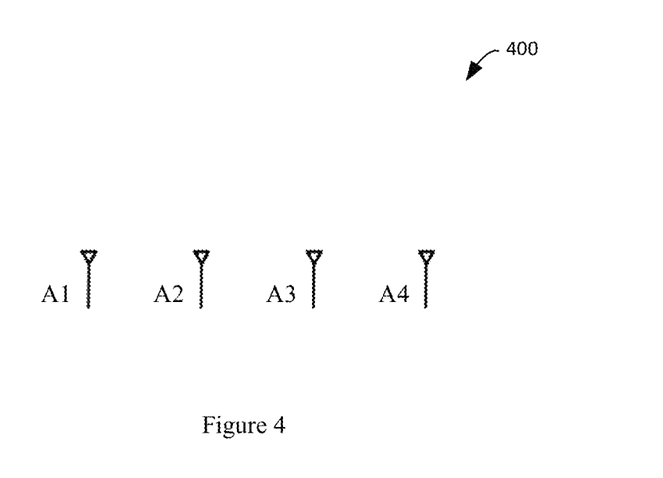
FIG. 4 is a schematic diagram of a linear array of antennas.
Figure 5:
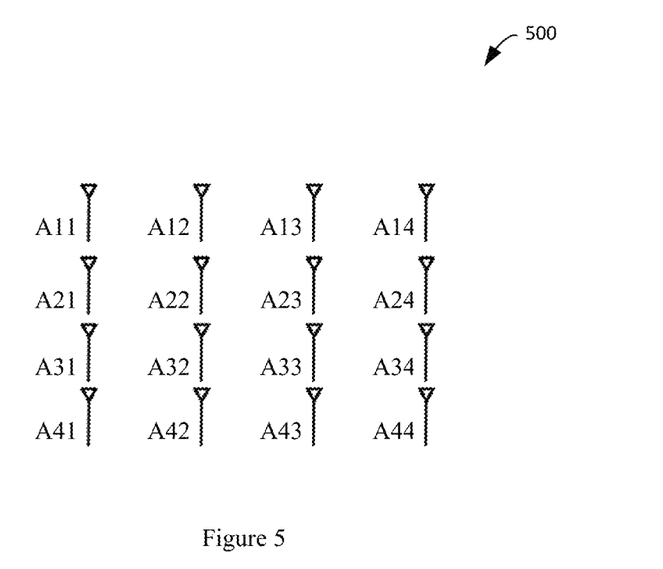
FIG. 5 is a schematic diagram of a two dimensional array of antennas.
Figure 6:
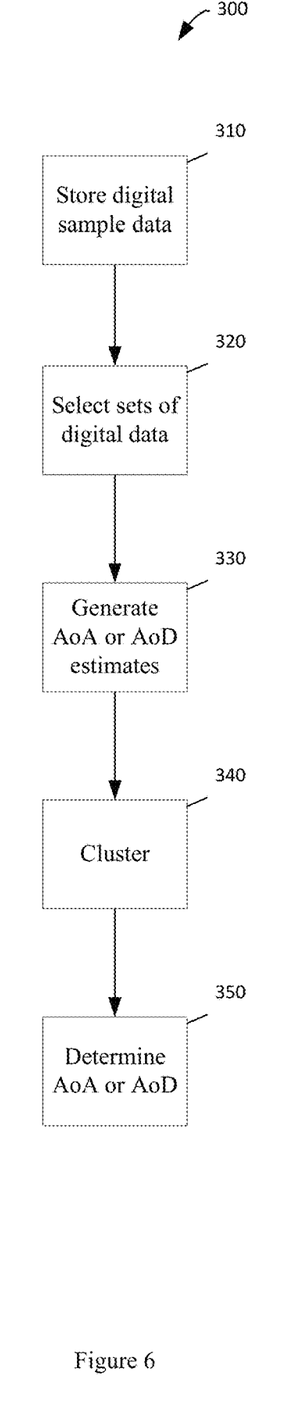
FIG. 6 is a flowchart diagram illustrating a method of determining AoA or AoD.
Figure 7:
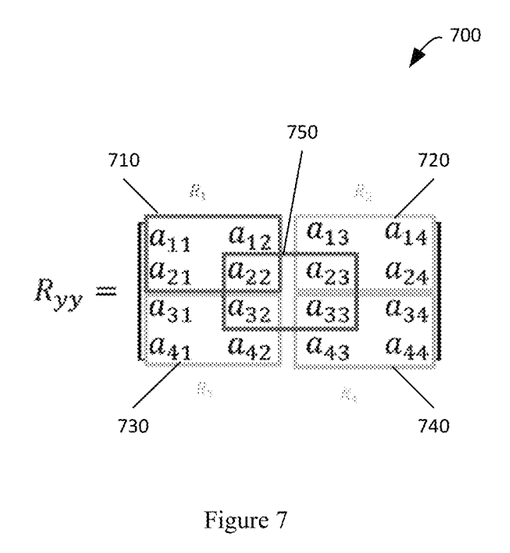
FIG. 7 is a graphical representation of a covariance matrix used for calculating AoA or AoD.

Embodiments illustrate circuits and methods for determining a measured angle of arrival (AoA) or angle of departure (AoD) of a received signal. The AoA or AoD is determined based on a number of samples of estimates of AoA or AoD, where outliers of the sample set are excluded using, for example a clustering algorithm. Each estimate of AoA or AoD is generated using data from one set of a group of sets of transmit or receive antennas. In order to increase the size of the sample set for the clustering algorithm, each transmit or receive antenna may be represented in multiple sets of the group. FIGS. 1A and 1B respectively illustrate schematic diagrams of a receiver circuit and a transmitter circuit. FIGS. 2A and 2B respectively illustrate AoA and AoD. FIG. 3 illustrates multiple AoA or AoD estimations. FIGS. 4 and 5 illustrate arrays of antennas. FIG. 6 illustrates a method of determining AoA or AoD. FIG. 7 illustrates a covariance matrix used for calculating AoA or AoD.

FIG. 1A is a schematic diagram of an embodiment of a transmitter circuit 100 according to an embodiment. Transmitter circuit 100 includes antenna or antenna array 110, switch 120, RF chain 130, and controller 140. Transmitter circuit 100 illustrates a particular example. Other embodiments of transmitter circuits may be used.

Antenna or antenna array 110 may be any antenna or antenna array. For example, in some embodiments, antenna or antenna array 110 includes 1, 2, 3, 4, or more antennas. In some embodiments, antenna or antenna array 110 includes a linear antenna array. In some embodiments, antenna or antenna array 110 includes a two dimensional antenna array, for example, having multiple rows of linear antenna arrays.

In embodiments where antenna or antenna array 110 includes one antenna, the one antenna may be connected directly to RF chain 130, and switch 120 may be omitted. In embodiments where antenna or antenna array 110 includes multiple antennas, each antenna may be directly connected to a separate RF chain. Each of the RF chains may have the features of RF chain 130.

Antenna or antenna array 110 may be configured to transmit RF signals to a receiver circuit, such as receiver circuit 200 described below with reference to FIG. 1B. The RF signals include a high frequency signal at a carrier frequency modulated with a low frequency information signal. The high frequency signal is transmitted by one of the antennas from antenna or antenna array 110, for example, according to a programmable electrical connection formed by switch 120, as controlled by controller 140. At least because of reflections, a particular signal transmitted by transmitter circuit 100 may arrive at the receiver after having traversed each of multiple transmission paths. Each of the transmission paths may terminate at the receiver with a different AoA. Additionally, the RF signals transmitted by antenna or antenna array 110 is transmitted from transmitter 100 with an AoD.

Controller 140 is configured to provide a digital signal to RF chain 130, where the digital signal encodes the information signal to be transmitted by antenna or antenna array 110.

RF chain 130 includes digital to analog converter (DAC) 132, mixer 136, frequency synthesizer 134, and power amplifier (PA) 138. RF chain 130 is an example only, and embodiments of other RF chains may alternatively be used. For example, in some embodiments, one or more amplifiers, and/or filters may be included, as understood by those of skill in the art.

The digital signal is processed by the digital to analog converter 132 to generate an analog baseband signal (BB signal) representing the digital signal, using techniques known in the art. Various digital to analog converter structures known in the art may be used.

Mixer 136 receives the analog baseband signal output from the digital to analog converter 132 and an oscillator signal at the carrier frequency generated by frequency synthesizer 134. In response to the analog baseband signal and the oscillator signal, mixer 136 up converts the analog baseband signal from the analog-to-digital converter 132 to a high frequency signal, using techniques known in the art. Various mixer structures known in the art may be used. The resulting high frequency signal is at the carrier frequency in this modulated so as to include the information of the low frequency information signal.

Power amplifier 138 is configured to receive the high frequency signal the high frequency signal is driven to one of the antennas from antenna or antenna array 110, for example, according to a programmable electrical connection formed by switch 120, as controlled by controller 140. The power amplifier 138 drives the high frequency signal to one of the antennas using techniques known in the art. Various power amplifier structures known in the art may be used.

As understood by those of skill in the art, using communication connectivity not illustrated in FIG. 1A, control signals from controller 140 may control certain variable functionality of switch 120, power amplifier 138, frequency synthesizer 134, mixer 136, and digital to analog converter 132, for example, as understood by those of skill in the art.

The control signals from controller 140 may, for example, control switch 120 to control which of multiple antennas RF chain 130 drives the high frequency signal with.

In embodiments having multiple antennas each connected to one of multiple RF chains, controller 140 may generate control signals for each of the RF chains.

FIG. 1B is a schematic diagram of an embodiment of a receiver circuit 200 according to an embodiment. Receiver circuit 200 includes antenna or antenna array 210, switch 220, RF chain 230, and controller 240. Receiver circuit 200 illustrates a particular example. Other embodiments of receiver circuits may be used.

Antenna or antenna array 210 may be any antenna or antenna array. For example, in some embodiments, antenna or antenna array 210 includes 1, 2, 3, 4, or more antennas. In some embodiments, antenna or antenna array 210 includes a linear antenna array. In some embodiments, antenna or antenna array 210 includes a two dimensional antenna array, for example, having multiple rows of linear antenna arrays.

In embodiments where antenna or antenna array 210 includes one antenna, the one antenna may be connected directly to RF chain 230, and switch 220 may be omitted. In embodiments where antenna or antenna array 210 includes multiple antennas, each antenna may be directly connected to a separate RF chain. Each of the RF chains may have the features of RF chain 230.

Antenna or antenna array 210 may be configured to receive RF signals generated by a transmitter, such as transmitter 100 described above with reference to FIG. 1A. At least because of reflections, a particular signal transmitted by the transmitter may arrive at the antenna or antenna array 210 after having traversed each of multiple transmission paths. Each of the transmission paths may terminate at the antenna or antenna array 210 with a different AoA. Additionally, the RF signals transmitted by the transmitter 100 is transmitted with an AoD.

RF chain 230 includes low noise amplifier (LNA) 232, frequency synthesizer 234, mixer 236, and analog to digital converter (ADC) 238. RF chain 230 is an example only, and embodiments of other RF chains may alternatively be used. For example, in some embodiments, one or more amplifiers, and/or filters may be included, as understood by those of skill in the art.

Low noise amplifier 232 is configured to receive a high frequency signal at a carrier frequency and modulated with a low frequency information signal. The high frequency signal is received from one of the antennas from antenna or antenna array 210, for example, according to a programmable electrical connection formed by switch 220, as controlled by controller 240. The high frequency signal is amplified by low noise amplifier 232 to generate an amplified RF signal, using techniques known in the art. Various low noise amplifier structures known in the art may be used.

Mixer 236 receives the amplified RF signal output from the low noise amplifier 232 and an oscillator signal at or substantially at the carrier frequency generated by frequency synthesizer 234. In response to the amplified RF signal and the oscillator signal, mixer 236 down converts the amplified RF signal from the low noise amplifier 232 to a baseband signal, using techniques known in the art. Various mixer structures known in the art may be used. The resulting baseband signal includes information of the low frequency information signal.

The baseband signal is then processed by the analog-to-digital converter 238 to generate a digital signal representing the baseband signal, using techniques known in the art. Various analog-to-digital converter structures known in the art may be used.

Controller 240 receives the digital representation of the baseband signal.

As understood by those of skill in the art, using communication connectivity not illustrated in FIG. 1B, control signals from controller 240 may control certain variable functionality of switch 220, low noise amplifier 232, frequency synthesizer 234, mixer 236, and analog-to-digital converter 238, for example, as understood by those of skill in the art.

The control signals from controller 240 may, for example, control switch 220 to select which of multiple antennas RF chain 230 receives the high frequency signals from.

For example, controller 240 may generate control signals which result in controller 240 receiving a group of digital signals, where each digital signal of the group is generated by RF chain 230 based on a high frequency signal received by a selected one of the antennas. In embodiments having multiple antennas each connected to one of multiple RF chains, controller 240 may generate control signals for each of the RF chains, such that controller 240 receives a group of digital signals, where each digital signal of the group is generated by one of the RF chains based on an RF signal received by the particular antenna connected thereto. Using techniques described below, controller 240 is configured to store the group of digital signals in a memory, and to determine an AoA or AoD for the received RF signals based on the group of digital signals it receives.

FIG. 2A is a schematic diagram illustrating the geometry of phase-based estimation of angle of arrival (AoA) of an RF signal received at an antenna array comprising antenna A1 and antenna A2.

As shown, the transmitted RF signal is received at an angle of arrival (AoA) θ at antennas A1 and A2. According to geometric and trigonometric principles understood by those of skill in the art, $$AoA = \theta = \arccos\left(\frac{\lambda \psi}{2\pi d}\right),$$

where
λ=wavelength of the RF signal,
ψ=the phase or time difference between the signals arrival at antennas A1 and A2, and
d=distance between antennas A1 and A2.

Using techniques known to those of skill in the art, a controller, such as controller 240 of receiver circuit 200 of FIG. 1B, may calculate AoA.

For example, an embodiment of receiver circuit 200 having one RF chain for each of antennas A1 and A2, assuming no carrier frequency offset, may calculate AoA as follows:

For transmitted signal $e^{-i2\pi f_h t_1} e^{-i2\pi f_I t_1}$, where:
 $f_h$=the carrier frequency,
 $t_1$=the time of the transmitter oscillator
 $f_I$=the baseband frequency,
 the signal received at antenna A1 is $e^{-i2\pi f_h t_1} e^{-i2\pi f_I t_1} e^{i\varphi_1}$, where:
 $\varphi_1$=the signal phase of the received sample; and
 the signal received at antenna A2 is $e^{-i2\pi f_h t_1} e^{-i2\pi f_I t_1} e^{i\varphi_2}$, where:
 $\varphi_2$=the signal phase of the received sample.

The downconverted sample received at antenna A1 is:

$$e^{i2\pi f_h t_2} e^{-i2\pi f_h t_1} e^{-i2\pi f_I t_1} e^{i\varphi_1} = e^{-i2\pi f_h(t_1-t_2)} e^{-i2\pi f_I t_1} e^{i\varphi_1},$$

where:
 $t_2$=the time of the receiver oscillator.

The downconverted sample received at antenna A2 is:

$$e^{i2\pi f_h t_2} e^{-i2\pi f_h t_1} e^{-i2\pi f_I t_1} e^{i\varphi_2} = e^{-i2\pi f_h(t_1-t_2)} e^{-i2\pi f_I t_1} e^{i\varphi_2}.$$

The phase difference is:

$$(-2\pi f_h(t_1 - t_2) - 2\pi f_I t_1 + \varphi_2) - (-2\pi f_h(t_1 - t_2) - 2\pi f_I t_1 + \varphi_1) = \varphi_2 - \varphi_1.$$

$$AoA = \theta = \arccos\left(\frac{\lambda(\phi_2 - \phi_1)}{2\pi d}\right).$$

as discussed above.

Alternatively, an embodiment of receiver circuit 200 having one RF chain for both antennas A1 and A2, assuming no carrier frequency offset, may calculate AoA as follows:

For transmitted signal $e^{-i2\pi f_h t_1} e^{-i2\pi f_I t_1}$, where:
 $f_h$=the carrier frequency,
 $t_1$=the time of the transmitter oscillator
 $f_I$=the baseband frequency, the signal received at antenna A1 is $e^{-i2\pi f_h t_1} e^{-i2\pi f_I t_1} e^{i\varphi_1}$, where:
 $\varphi_1$=the signal phase of the received sample; and
 the signal received at antenna A2 is $e^{-i2\pi f_h(t_1+T)} e^{-i2\pi f_I(t_1+T)} e^{i\varphi_2}$, where:
 $\varphi_2$=the signal phase of the received sample, and
 T=the sampling period.

The downconverted sample received at antenna A1 is:

$$e^{-i2\pi f_h t_2} e^{-i2\pi f_h t_1} e^{-i2\pi f_I t_1} e^{i\varphi_1} = e^{-i2\pi f_h(t_1-t_2)} e^{-i2\pi f_I t_1} e^{i\varphi_1},$$

where:
 $t_2$=the time of the receiver oscillator.

The downconverted sample received at antenna A2 is:

$$e^{i2\pi f_h(t_2+T)} e^{-i2\pi f_h(t_1+T)} e^{-i2\pi f_I(t_1+T)} e^{i\varphi_2} = e^{-i2\pi f_h(t_1-t_2)} e^{-i2\pi f_I(t_1+T)} e^{i\varphi_2}.$$

The phase difference is:

$(-2\pi f_h(t_1-t_2)-2\pi f_I(t_1+T)+\varphi_2)-(-2\pi f_h(t_1-t_2)-2\pi f_I t_1+\varphi_1)=-2\pi f_I T+\varphi_2-\varphi_1.$ Therefore, $\varphi_2-\varphi_1=(-2\pi f_h(t_1-t_2)-2\pi f_I(t_1+T)+\varphi_2)-(-2\pi f_h(t_1-t_2)-2\pi f_I t_1+\varphi_1)+2\pi f_I T.$ Accordingly, the phase difference for calculating AoA $(\varphi_2-\varphi_1)$ is equal to the phase difference measured $+2\pi f_I T$.

$$AoA = \theta = \arccos\left(\frac{\lambda(\varphi_2 - \varphi_1)}{2\pi d}\right),$$

as discussed above.

FIG. 2B is a schematic diagram illustrating the geometry of phase-based estimation of angle of departure (AoD) of an RF signal transmitted by an antenna array comprising antenna A1 and antenna A2.

As shown, the RF signal is transmitted at an angle of departure (AoD) θ from antennas A1 and A2. According to geometric and trigonometric principles understood by those of skill in the art, $$AoD = \theta = \arccos\left(\frac{\lambda\psi}{2\pi d}\right),$$

where
 λ=wavelength of the RF signal transmitted from antennas A1 and A2,
 ψ=the phase or time difference between the signals arrival at antenna RX, and
 d=distance between antennas A1 and A2.

Using techniques known to those of skill in the art, a controller, such as controller 240 of receiver circuit 200 of FIG. 1B, may calculate AoD.

For example, an embodiment of receiver circuit 200 having one RF chain and a single antenna A1, assuming no carrier frequency offset, may calculate AoD as follows:

For signals respectively transmitted from antennas A1 and A2:

$$e^{-i2\pi f_h t_1} e^{-i2\pi f_I t_1}, \text{ and } e^{-i2\pi f_h(t_1+T)} e^{-i2\pi f_I(t_1+T)}$$

where:
 $f_h$=the carrier frequency,
 $t_1$=the time of the transmitter oscillator
 $f_I$=the baseband frequency, the first sample received at antenna RX is $e^{-i2\pi f_h t_1} e^{-i2\pi f_I t_1} e^{i\varphi_1}$, where:
 $\varphi_1$=the signal phase of the first sample; and
 the second sample received at antenna RX is $e^{-i2\pi f_h(t_1+T)} e^{-i2\pi f_I(t_1+T)} e^{i\varphi_2}$, where:
 $\varphi_2$=the signal phase of the second sample, and
 T=the sampling period.

The downconverted first sample is:

$$e^{i2\pi f_h t_2} e^{-i2\pi f_h t_1} e^{-i2\pi f_I t_1} e^{i\varphi_1} = e^{-i2\pi f_h(t_1-t_2)} e^{-i2\pi f_I t_1} e^{i\varphi_1},$$

where:
 $t_2$=the time of the receiver oscillator.

The downconverted second sample is:

$$e^{i2\pi f_h(t_2+T)} e^{-i2\pi f_h(t_1+T)} e^{-i2\pi f_I(t_1+T)} e^{i\varphi_2} = e^{-i2\pi f_h(t_1-t_2)} e^{-i2\pi f_I(t_1+T)} e^{i\varphi_2}.$$

The phase difference is:

$(-2\pi f_h(t_1-t_2)-2\pi f_I(t_1+T)+\varphi_2)-(-2\pi f_h(t_1-t_2)-2\pi f_I t_1+\varphi_1)=-2\pi f_I T+\varphi_2-\varphi_1.$ Therefore, $\varphi_2-\varphi_1=(-2\pi f_h(t_1-t_2)-2\pi f_I(t_1-t_2)-2\pi f_I(t_1+T)+\varphi_2)-(-2\pi f_h(t_1-t_2)-2\pi f_I t_1+\varphi_1)+2\pi f_I T.$ Accordingly, the phase difference for calculating AoD $(\varphi_2-\varphi_1)$ is equal to the phase difference measured $+2\pi f_I T$.

$$AoD = \theta = \arccos\left(\frac{\lambda(\varphi_2 - \varphi_1)}{2\pi d}\right),$$

as discussed above.

FIG. 3 is a graph illustrating multiple AoA or AoD estimations, where some of the estimations are made based on alternate transmission paths.

The Reliable estimations illustrated in FIG. 3 may have been made using calculations for AoA or AoD discussed herein based on samples received at a receiver directly from a transmitter. For example, the samples used to calculate the Reliable estimations may have been transmitted by the transmitter and received by the receiver with no reflections.

The Outliers illustrated in FIG. 3 may be estimations made using calculations for AoA or AoD discussed herein based on samples received at a receiver indirectly from a transmitter. For example, the samples used to calculate the Outliers estimations may have been transmitted by the transmitter and received by the receiver after one or more reflections.

A determination of the measured AoA or AoD may be made based on the estimations, using techniques known to those of skill in the art. For example a determination of the actual AoA or AoD may be made by taking an average of the estimations.

In some embodiments, prior to determining the measured AoA or AoD based on the estimations, the Outliers estimations may be removed from the group of estimations used for determining the measured AoA or AoD. For example, a clustering algorithm, such as DBSCAN, may be used to distinguish the Reliable estimations from the Outliers estimations. The determination of the measured AoA or AoD may be subsequently made based on the Reliable estimations, ignoring the Outliers estimations.

FIG. 4 is a schematic diagram of an example of a linear array 400 of antennas, which may, for example, be used as an antenna array, such as antenna array 210 of a receiver circuit, such as receiver circuit 200. For example, each of the antennas of antenna array 400 may be used to receive signals transmitted by a transmitter, such as transmitter 100 of FIG. 1. Based on the received signals, the receiver circuit generates digital data corresponding with the received signal for each of the antennas of the antenna array 400 using techniques such as those discussed herein, or other techniques known to those of skill in the art.

Linear antenna array 400 may alternatively be used as an antenna array, such as antenna array 110 of a transmitter circuit, such as transmitter circuit 100. For example, each of the antennas of antenna array 400 may be used to transmit signals to a receiver circuit, such as receiver 200 of FIG. 2 having a single receiver antenna. Based on the received signals, the receiver circuit generates digital data corresponding with the signals transmitted from each of the antennas of the antenna array 400 using techniques such as those discussed herein, or other techniques known to those of skill in the art.

In embodiments of linear antenna array 400 used for a receiver circuit, using techniques similar to those discussed herein, or other techniques known to those of skill in the art, the data generated based on signals received by antennas A1, A2, A3, and A4 may be used to calculate an estimate of the AoA.

In embodiments of linear antenna array 400 used for a transmitter circuit, using techniques similar to those discussed herein, or other techniques known to those of skill in the art, the data generated based on signals transmitted by antennas A1, A2, A3, and A4 may be used to calculate an estimate of the AoD.

In addition, in embodiments of linear antenna array 400 used for a receiver circuit, using techniques similar to those discussed herein, or other techniques known to those of skill in the art, the data generated based on signals received by sets of three antennas may be used to calculate an estimate of the AoA. Furthermore, in embodiments of linear antenna array 400 used for a transmitter circuit, using techniques similar to those discussed herein, or other techniques known to those of skill in the art, the data generated based on signals transmitted by sets of three antennas may be used to calculate an estimate of the AoD.

For example, the data generated based on signals received or transmitted by antenna A1, antenna A2, and antenna A3 may be used to calculate a first estimate of the AoA or AoD, the data generated based on signals received by antenna A2, antenna A3, and antenna A4 may be used to calculate a second estimate of the AoA or AoD.

The first and second estimates of AoA or AoD based on signals received or transmitted by the sets of three antennas can be used to determine a measured AoA or AoD using techniques described elsewhere herein, or by using other techniques understood by those of skill in the art.

In some embodiments, the first and second estimates of AoA or AoD based on signals received or transmitted by the sets of three antennas, and the estimate of AoA or AoD based on signals received or transmitted by all four antennas and can be used to determine a measured AoA or AoD using techniques described elsewhere herein, or by using other techniques understood by those of skill in the art.

In addition, using techniques similar to those discussed herein, or other techniques known to those of skill in the art, the data generated based on signals received or transmitted by pairs of antennas may be used to calculate an estimate of the AoA or AoD. For example, the data generated based on signals received or transmitted by antenna A1 and antenna A2 may be used to calculate a first estimate of the AoA or AoD, the data generated based on signals received or transmitted by antenna A2 and antenna A3 may be used to calculate a second estimate of the AoA or AoD, and the data generated based on signals received or transmitted by antenna A3 and antenna A4 may be used to calculate a third estimate of the AoA or AoD.

The first, second, and third estimates of AoA or AoD based on signals received or transmitted by the pairs of antennas can be used to determine a measured AoA or AoD using techniques described elsewhere herein, or by using other techniques understood by those of skill in the art.

In some embodiments, the first, second, and third estimates of AoA or AoD based on signals received or transmitted by the pairs of antennas, and either or both of the first and second estimates of AoA or AoD based on signals received or transmitted by the sets of three antennas, and the estimate of AoA or AoD based on signals received or transmitted by all four antennas and can be used to determine a measured AoA or AoD using techniques described elsewhere herein, or by using other techniques understood by those of skill in the art. For example, the estimates of AoA or AoD may be applied to a clustering algorithm to remove outlier samples, as discussed herein, and the reliable estimates may be used to calculate a measured AoA or AoD.

Because at least some clustering algorithms generate better results if more samples are provided to the clustering algorithm, using more estimates of AoA or AoD, may produce a more accurate measured AoA or AoD. In the example embodiments discussed herein, digital data corresponding with the received or transmitted signal for each of the antennas of the antenna array 400 is generated using techniques such as those discussed herein, or other techniques known to those of skill in the art. Accordingly, four digital data samples are generated—one for each antenna of the antenna array 400. And, based on the four digital data samples, a number of estimates of AoA or AoD are calculated. In the examples above, six estimates of AoA or AoD are calculated based on the four digital samples.

In alternative embodiments, using techniques similar or identical to those described elsewhere herein, or by using other techniques understood by those of skill in the art, estimates of AoA or AoD may be additionally or alternatively calculated based on subsets of the four digital samples where at least one pair of antennas corresponding with the subset has another antenna therebetween, and where the digital data of the other antenna is not included in the subset. For example, the data generated based on signals received or transmitted by antenna A1 and antenna A3 may be used to calculate an estimate of the AoA or AoD. In order to increase the number of samples for the clustering algorithm, some or all of these estimates may be used for calculating the measured AoA or AoD.

For a set of N antennas in a receiver or transmitter circuit, the total number of estimates of AoA or AoD may be:

$$\sum_{k=1}^{N}\binom{N}{k}$$

Accordingly, for the four antenna array 400, 15 estimates of AoA or AoD may be generated and used to calculate a measured AoA or AoD.

In addition, in embodiments of linear antenna array 400 used in a receiver circuit, based on the received signals, the receiver circuit may generate multiple samples of data based on signals received at each of antennas A1, A2, A3, and A4 over a period of time. In addition, the multiple samples based on signals received at each of antennas A1, A2, A3, and A4 may be used to calculate multiple AoA estimates. Furthermore, in embodiments of linear antenna array 400 used for a transmitter circuit, based on the received signals, the receiver circuit may generate multiple samples of data based on signals received from each of antennas A1, A2, A3, and A4 over a period of time. In addition, the multiple samples based on signals received from each of antennas A1, A2, A3, and A4 may be used to calculate multiple AoD estimates.

For example, N samples may be generated based on signals received or transmitted by each of antennas A1, A2, A3, and A4 over the period of time.

In some embodiments, the first sample generated based on signals received or transmitted by antenna A1, the first sample generated based on signals received or transmitted by antenna A2, the first sample generated based on signals received or transmitted by antenna A3, and the first sample generated based on signals received or transmitted by antenna A4 may be used to calculate a first estimate of AoA or AoD. Similarly, the nth sample generated based on signals received or transmitted by antenna A1, the nth sample generated based on signals received or transmitted by antenna A2, the nth sample generated based on signals received or transmitted by antenna A3, and the nth sample generated based on signals received or transmitted by antenna A4 may be used to calculate an nth estimate of AoA or AoD. Accordingly, N estimates of AoA or AoD may be calculated using the N samples generated based on signals received or transmitted by each of antennas A1, A2, A3, and A4.

The N estimates of AoA or AoD determined based on the N samples generated based on signals received or transmitted by each of antennas A1, A2, A3, and A4 can be used to determine a measured AoA or AoD using techniques described elsewhere herein, or by using other techniques understood by those of skill in the art. For example, the N estimates of AoA or AoD determined based on the N samples generated based on signals received or transmitted by each of antennas A1, A2, A3, and A4 may be applied to a clustering algorithm to remove outlier samples, as discussed above, and the reliable estimates may be used to calculate a measured AoA or AoD.

In some embodiments, the first sample generated based on signals received or transmitted by antenna A1, the first sample generated based on signals received or transmitted by antenna A2, and the first sample generated based on signals received or transmitted by antenna A3 may be used to calculate a first estimate of AoA or AoD. In addition, the first sample generated based on signals received or transmitted by antenna A2, the first sample generated based on signals received or transmitted by antenna A3, and the first sample generated based on signals received or transmitted by antenna A4 may be used to calculate a second estimate of AoA or AoD. Similarly, the nth sample generated based on signals received or transmitted by antenna A1, the nth sample generated based on signals received or transmitted by antenna A2, and the nth sample generated based on signals received or transmitted by antenna A3 may be used to calculate a third estimate of AoA or AoD, and the nth sample generated based on signals received or transmitted by antenna A2, the nth sample generated based on signals received or transmitted by antenna A3, and the nth sample generated based on signals received or transmitted by antenna A4 may be used to calculate a fourth estimate of AoA or AoD. Accordingly, N*2 estimates of AoA or AoD may be calculated using the N samples generated based on signals received or transmitted by each of antennas A1, A2, A3, and A4.

The N*2 estimates of AoA or AoD determined based on the N samples generated based on signals received or transmitted by each of the first set of antennas A1, A2, and A3 and the second set of antennas A2, A3, and A4 can be used to determine a measured AoA or AoD using techniques described elsewhere herein, or by using other techniques understood by those of skill in the art. For example, the N*2 estimates of AoA or AoD may be applied to a clustering algorithm to remove outlier samples, as discussed above, and the reliable estimates may be used to calculate a measured AoA or AoD.

In some embodiments, the N*2 estimates of AoA or AoD determined based on the N samples generated based on signals received or transmitted by each of the first set of antennas A1, A2, and A3 and the second set of antennas A2, A3, and A4 and the N estimates of AoA or AoD determined based on the N samples generated based on signals received or transmitted by the set of all antennas A1, A2, A3, and A4 can be used to determine a measured AoA or AoD using techniques described elsewhere herein, or by using other techniques understood by those of skill in the art. For example, the N*2 estimates and the N estimates of AoA or AoD may be applied to a clustering algorithm to remove outlier samples, as discussed above, and the reliable estimates may be used to calculate a measured AoA or AoD.

In some embodiments, the first sample generated based on signals received or transmitted by antenna A1 and the first sample generated based on signals received or transmitted by antenna A2 may be used to calculate a first estimate of AoA or AoD. In addition, the first sample generated based on signals received or transmitted by antenna A2 and the first sample generated based on signals received or transmitted by antenna A3 may be used to calculate a second estimate of AoA OR AoD. Furthermore, the first sample generated based on signals received or transmitted by antenna A3 and the first sample generated based on signals received or transmitted by antenna A4 may be used to calculate a third estimate of AoA OR AoD. Similarly, the nth sample generated based on signals received or transmitted by antenna A1 and the nth sample generated based on signals received or transmitted by antenna A2 may be used to calculate a fourth estimate of AoA OR AoD. In addition, the nth sample generated based on signals received or transmitted by antenna A2 and the nth sample generated based on signals received or transmitted by antenna A3 may be used to calculate a fifth estimate of AoA OR AoD. Furthermore, the nth sample generated based on signals received or transmitted by antenna A3 and the nth sample generated based on signals received or transmitted by antenna A4 may be used to calculate a sixth estimate of AoA OR AoD. Accordingly, N*3 estimates of AoA OR AoD may be calculated using the N samples generated based on signals received or transmitted by each of antennas A1, A2, A3, and A4.

The N*3 estimates of AoA OR AoD determined based on the N samples generated based on signals received or transmitted by each of the pairs of antennas A1 and A2, A2 and A3, and A3 and A4 can be used to determine a measured AoA OR AoD using techniques described elsewhere herein, or by using other techniques understood by those of skill in the art. For example, the N*3 estimates of AoA OR AoD may be applied to a clustering algorithm to remove outlier samples, as discussed above, and the reliable estimates may be used to calculate a measured AoA OR AoD.

In some embodiments, the N*3 estimates of AoA OR AoD determined based on the N samples generated based on signals received or transmitted by each of the pairs of antennas A1 and A2, A2 and A3, and A3 and A4, and either or both of the N*2 estimates of AoA OR AoD determined based on the N samples generated based on signals received or transmitted by each of the first set of antennas A1, A2, and A3 and the second set of antennas A2, A3, and A4 and the N estimates of AoA OR AoD determined based on the N samples generated based on signals received or transmitted by the set of all antennas A1, A2, A3, and A4 can be used to determine a measured AoA OR AoD using techniques described elsewhere herein, or by using other techniques understood by those of skill in the art. For example, the N*3 estimates, the N*2 estimates, and the N estimates of AoA OR AoD may be applied to a clustering algorithm to remove outlier samples, as discussed above, and the reliable estimates may be used to calculate a measured AoA OR AoD.

Because at least some clustering algorithms generate better results if more samples are provided to the clustering algorithm, using more estimates of AoA or OAD, may produce a more accurate measured AoA or AoD. In some of the example embodiments discussed above, digital data corresponding with the received or transmitted signal for each of the antennas of the antenna array 400 is generated for each of M sampling times. Accordingly, 4*M digital data samples are generated. And, based on the 4*M digital data samples, a number of estimates of AoA or AoD are calculated. In the examples above, 6*M estimates of AoA or AoD are calculated based on the 4*M digital samples.

In alternative embodiments, using techniques similar or identical to those described elsewhere herein, or by using other techniques understood by those of skill in the art, estimates of AoA or AoD may be additionally or alternatively calculated based on subsets of the four digital samples for each sampling time, where at least one pair of antennas corresponding with the subset has another antenna therebetween, and where the digital data of the other antenna is not included in the subset. For example, the data generated based on signals received or transmitted by antenna A1 and antenna A3 may be used to calculate an estimate of the AoA or AoD for each sampling time. In order to increase the number of samples for the clustering algorithm, some or all of these estimates may be used for calculating the measured AoA or AoD.

For a set of M samples of data from N antennas in a receiver or transmitter circuit, the total number of estimates of AoA or AoD may be:

$$M\sum_{k=1}^{N}\binom{N}{k}$$

Accordingly, for the four antenna array 400, 15 estimates of AoA or AoD may be generated for each of the M sampling times and, where M=10, 150 estimates may be used to calculate a measured AoA or AoD.

FIG. 5 is a schematic diagram of an example of a two dimensional array 500 of antennas, which may, for example, be used as an antenna array, such as antenna array 210 of a receiver circuit, such as receiver circuit 200. For example, each of the antennas of antenna array 500 may be used to receive signals transmitted by a transmitter, such as transmitter 100 of FIG. 1. Based on the received signals, the receiver circuit generates digital data corresponding with the received signal for each of the antennas of the antenna array 500 using techniques such as those discussed herein, or other techniques known to those of skill in the art.

Two dimensional antenna array 500 may alternatively be used as an antenna array, such as antenna array 110 of a transmitter circuit, such as transmitter circuit 100. For example, each of the antennas of antenna array 500 may be used to transmit signals to a receiver circuit, such as receiver 200 of FIG. 2. Based on the received signals, the receiver circuit generates digital data corresponding with the signals transmitted from each of the antennas of the antenna array 500 using techniques such as those discussed herein, or other techniques known to those of skill in the art.

In embodiments of two dimensional antenna array 500 used for a receiver circuit, using techniques similar to those discussed herein, or other techniques known to those of skill in the art, the data generated based on signals received by any combination of the antennas may be used to calculate estimates of the AoA or AoD. In addition, using techniques similar or identical to those discussed herein, or other techniques known to those of skill in the art, the estimates of AoA and AoD may be used to determine a measured AoA or AoD. For example, the estimates of AoA or AoD may be applied to a clustering algorithm to remove outlier samples, as discussed above, and the reliable estimates may be used to calculate a measured AoA or AoD.

In the example of FIG. 5, digital data corresponding with the received or transmitted signal for each of the antennas of the antenna array 500 is generated using techniques such as those discussed herein, or other techniques known to those of skill in the art. Accordingly, 16 digital data samples are generated—one for each antenna of the antenna array 500. As discussed above, more samples for the clustering algorithm may produce a more accurate measured AoA or AoD.

Based on the 16 digital data samples, a number of estimates of AoA or AoD may be calculated. In the example of FIG. 5, $$\sum_{k=1}^{16}\binom{16}{k}$$

estimates of AoA or AoD may be calculated based on the 16 digital samples.

In some embodiments, fewer than $$\sum_{k=1}^{16}\binom{16}{k}$$

estimates of AoA or AoD may be preferred for determining the measured AoA or AoD. Accordingly, certain estimates of the $$\sum_{k=1}^{16}\binom{16}{k}$$

estimates may be calculated and used for determining the measured AoA or AoD, and certain other estimates of the $$\sum_{k=1}^{16}\binom{16}{k}$$

estimates may not be calculated. In some embodiments, all of the $$\sum_{k=1}^{16}\binom{16}{k}$$

estimates are calculated, and only some of the $$\sum_{k=1}^{16}\binom{16}{k}$$

estimates are used for generating the measured AoA or AoD. Which estimates are calculated and used for generating the measured AoA or AoD may be determined based on characteristics of the sets of antennas used for generating the digital samples used to generate the estimates.

For example, sets of estimates which are calculated and used for generating the measured AoA or AoD may have one or more of the following characteristics:

1) one or more estimates of the set are based on data received or transmitted by a pair of adjacent antennas;
2) one or more estimates of the set are based on data received or transmitted by a group of three antennas having no other antennas therebetween;
3) one or more estimates of the set are based on data received or transmitted by a group of four antennas having no other antennas therebetween;
4) one or more estimates of the set are based on data received or transmitted by a group of 5, 6, 7, 8, 9, 10, 11, 12, 13, 14, or 15 antennas having no other antennas therebetween;
5) an estimate of the set is based on data received or transmitted by all 16 antennas;
6) each of a number of estimates of the set are based on data received or transmitted by one of a number of overlapping groups of antennas;
7) one or more estimates of the set are based on data received or transmitted by a group of 5, 6, 7, 8, 9, 10, 11, 12, 13, 14, or 15 antennas having one or more other antennas therebetween;
8) one or more estimates of the set are based on data received or transmitted by a group of 3, 4, 5, 6, 7, 8, 9, 10, 11, 12, 13, 14, 15, or 16 antennas having no other antennas therebetween, where data received or transmitted by one member of the group is excluded; and
9) one or more estimates of the set are based on data received or transmitted by a group of 3, 4, 5, 6, 7, 8, 9, 10, 11, 12, 13, 14, 15, or 16 antennas having no other antennas therebetween, where data received or transmitted by one or more members of the group is excluded.

In some embodiments, sets of estimates which are not calculated and used for generating the measured AoA or AoD may have one or more of the following characteristics:

1) one or more estimates of the set are based on data received or transmitted by a pair of adjacent antennas;
2) one or more estimates of the set are based on data received or transmitted by a group of three antennas having no other antennas therebetween;
3) one or more estimates of the set are based on data received or transmitted by a group of four antennas having no other antennas therebetween;
4) one or more estimates of the set are based on data received or transmitted by a group of 5, 6, 7, 8, 9, 10, 11, 12, 13, 14, or 15 antennas having no other antennas therebetween;
5) an estimate of the set is based on data received or transmitted by all 16 antennas;
6) each of a number of estimates of the set are based on data received or transmitted by one of a number of overlapping groups of antennas;
7) one or more estimates of the set are based on data received or transmitted by a group of 5, 6, 7, 8, 9, 10, 11, 12, 13, 14, or 15 antennas having one or more other antennas therebetween;
8) one or more estimates of the set are based on data received or transmitted by a group of 3, 4, 5, 6, 7, 8, 9, 10, 11, 12, 13, 14, 15, or 16 antennas having no other antennas therebetween, where data received or transmitted by one member of the group is excluded; and
9) one or more estimates of the set are based on data received or transmitted by a group of 3, 4, 5, 6, 7, 8, 9, 10, 11, 12, 13, 14, 15, or 16 antennas having no other antennas therebetween, where data received or transmitted by one or more members of the group is excluded.
10) one or more estimates of the set are based on data received or transmitted by a group of 2, 3, 4, 5, 6, 7, 8, 9, 10, 11, 12, 13, 14, 15, or 16 antennas spaced apart by a distance of at least $\lambda/2$.

For example, in some embodiments, the sets of estimates which are calculated and used for generating the measured AoA or AoD are based on data received or transmitted by any one or more of the following antenna groups:

1) {all 16 antennas};
2) {A11, A12, A21, A22}, {A31, A32, A41, A42}, {A13, A14, A23, A24}, {A33, A34, A43, A44}, and {A22, A23, A32, A33}; and
3) {A12, A13, A22, A23}, {A21, A22, A31, A32}, {A23, A24, A33, A34}, and {A32, A33, A42, A43}.

In addition, in embodiments of two dimensional antenna array 500 used for a receiver circuit, based on the received signals, the receiver circuit may generate multiple samples of data based on signals received at each of the 16 antennas over a period of time. In addition, the multiple samples based on signals received at each of the 16 antennas may be used to calculate multiple estimates of AoA. Furthermore, in embodiments of two dimensional antenna array 500 used for a transmitter circuit, based on the received signals, the receiver circuit may generate multiple samples of data based on signals received from each of the 16 antennas over a period of time. In addition, the multiple samples based on signals received from each of the 16 antennas may be used to calculate multiple AoD estimates.

For example, N samples may be generated based on signals received or transmitted by each of the 16 antennas over the period of time. Accordingly, $$N \sum_{k=1}^{16} \binom{16}{k}$$

estimates of AoA or AoD determined based on the N samples generated based on signals received or transmitted by each of the 16 antennas can be used to determine a measured AoA or AoD using techniques described elsewhere herein, or by using other techniques understood by those of skill in the art.

In some embodiments, for each of the N sampling times for which samples are generated based on data received or transmitted by each of the 16 antennas, fewer than $$\sum_{k=1}^{16} \binom{16}{k}$$

estimates of AoA or AoD are determined and used for determining the measured AoA or AoD. Accordingly, certain estimates of the $$\sum_{k=1}^{16} \binom{16}{k}$$

estimates for each of the N sampling times may be calculated and used for determining the measured AoA or AoD, and certain other estimates of the $$\sum_{k=1}^{16} \binom{16}{k}$$

estimates for each of the N sampling times may not be calculated. In some embodiments, all of the $$\sum_{k=1}^{16} \binom{16}{k}$$

estimates for each of the N sampling times are calculated, and only some of the $$\sum_{k=1}^{16} \binom{16}{k}$$

estimates for each of the N sampling times are used for generating the measured AoA or AoD.

Which estimates are calculated and used for generating the measured AoA or AoD may be determined based on characteristics of the sets of antennas used for generating the digital samples used to generate the estimates. For example, sets of estimates which are calculated and used for generating the measured AoA or AoD may have one or more of the characteristics of antenna sets discussed above. In some embodiments, sets of estimates which are not calculated and used for generating the measured AoA or AoD may have one or more of the characteristics of antenna sets discussed above.

Antenna arrays 400 and 500 illustrate particular examples of antenna arrays, respectively having 4 and 16 antennas. The aspects, for example, related to generating measured AoA or AoD, discussed herein with reference to the antenna arrays 400 and 500 may be applied to linear and two dimensional antenna arrays having any number of antennas according to principles understood by those of skill in the art.

FIG. 6 is a flowchart diagram illustrating a method 300 of determining AoA or AoD.

At 310, digital samples generated based on signals either transmitted or received by an antenna array are stored in a memory of a receiver.

For example, signals may be transmitted from a transmitter circuit, such as transmitter circuit 100 and received at a receiver circuit, such as receiver circuit 200, where one of the transmitter circuit and the receiver circuit uses an array of multiple antennas, such as antenna array 400 or 500. The receiver circuit receive the transmitted signals and generates digital samples based on the received signals according to principles discussed herein and/or according to other techniques known to those of skill in the art. The receiver circuit also stores the generated digital samples in the memory.

At 320, the receiver determines sets of digital sample data to use for calculating estimates of AoA or AoD. For example, the receiver may determine sets of digital sample data based on characteristics of the sets of antennas used for generating the digital samples. For example, sets of antennas which are selected to generate estimates of AoA or AoD may have one or more of the characteristics of antenna sets discussed above. In some embodiments, sets of antennas which are not selected to generate estimates of AoA or AoD may have one or more of the characteristics of antenna sets discussed above.

At 330, the receiver circuit calculates estimates of AoA or AoD based on the sets of digital sample data determined at 320. For example, the receiver circuit may calculate an estimate of AoA or AoD based on each of the sets of digital sample data selected at 320. The receiver circuit may calculate the estimates using techniques discussed herein, and/or using other techniques known to those of skill in the art.

At 340, the receiver provides the calculated estimates of AoA or AoD to a clustering algorithm. Using techniques discussed herein and/or other techniques known to those of skill in the art, the clustering algorithm selects a subset of the estimates of AoA or AoD calculated at 330. For example, the subset of estimates of AoA or AoD selected by the clustering algorithm may exclude outlier estimates.

At 350, the receiver calculates a measured AoA or AoD based on the subset of estimates of AoA or AoD determined at 340. The receiver may calculate the measured AoA or AoD based on the estimates according to techniques discussed herein and/or other techniques known to those of skill in the art.

Applying the Method to MUSIC

In some embodiments, the aspects discussed herein, such as the method 300 may be applied using Multiple Signal Classification (MUSIC) principles. For example, a MUSIC based AoA/AoD measurement may be made based on decomposition of the received space into two orthogonal subspaces: signal subspace and noise subspace. In order to explain this, let's first formulate the received signal as y(t)=a(θ)x(t)+n(t):

y(t) is the matrix holding the signals of each antenna as a column.

x(t) is the transmitted signal, which in BLE case is a constant tone.

a(θ) is the steering vector which depends on the antenna array.

n(t) is the noise.

Examples of a(θ):

Array of 2 antennas:

$$a(\theta) = \left[1, e^{\frac{2\pi d}{\lambda}\cos(\theta)}\right]^T$$

Linear array of 4 antennas:

$$a(\theta) = \left[1, e^{\frac{2\pi d}{\lambda}\cos(\theta)}, e^{\frac{2\pi 2d}{\lambda}\cos(\theta)}, e^{\frac{2\pi 3d}{\lambda}\cos(\theta)}\right]^T$$

Rectangular array of 4 antennas:

$$a(\theta) = \left[1, e^{\frac{2\pi d}{\lambda}\cos(\theta)}, e^{\frac{2\pi d}{\lambda}\sin(\theta)}, e^{\frac{2\pi d}{\lambda}(\cos(\theta)+\sin(\theta))}\right]^2$$

The covariance matrix of the received vector is calculated as:

$$R_{yy} = \frac{1}{N}\sum_{t=1}^{N} y(t)y(t)^H$$

If $\{\gamma_1 \leq \gamma_2 \leq \ldots \leq \gamma_N\}$ and $\{v_1, v_2, \ldots, v_N\}$ are the eigenvalues and the corresponding eigenvectors of $R_{yy}$, and considering we have one source, then it can be shown that $\{v_1, v_2, \ldots, v_{N-1}\}$ are orthogonal to a(θ).

We refer to the subspace spanned by the eigenvectors corresponding to the smallest eigenvalues as the "noise" subspace and to its orthogonal complement, spanned by the "direction vectors" of the signals, as the "signal" subspace.

Given this, the spatial spectrum is now given by:

$$P(\theta) = \frac{1}{a(\theta)^H V V^H a(\theta)}$$

Where $V=[v_1, v_2, \ldots, v_{N-1}]^T$.

Based on the spatial spectrum, AoA/AoD is then estimated as $$\theta = \arg\max_{\theta} P(\theta).$$

Now we want to apply the proposed algorithm to MUSIC. To do so, we first divide the antenna array into sets of sub-arrays, for example, with similar steering vectors. For each set, we then calculate the covariance matrix for all the sub-arrays. The average covariance matrix for each set is then calculated as:

$$\overline{R} = \frac{1}{M}\sum_{m=1}^{M} R_m$$

Where M is the total number of sub-arrays in the set. Next, MUSIC is applied on the average covariance matrix $\overline{R}$ of all the sets.

FIG. 7 is a graphical representation of a covariance matrix 700 used for calculating AoA or AoD, where sub-arrays 710, 720, 730, 740, 750 are identified.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A receiver circuit, comprising:
one or more receiver antennas configured to receive a plurality of signals transmitted from a transmitter circuit comprising one or more transmit antennas, such that the plurality of signals is either transmitted from a single transmit antenna and received by N receiver antennas, or transmitted by N transmit antennas and received by a single receiver antenna;
at least one RF chain configured to generate a plurality of digital samples based on the received signals; and
a controller configured to:
determine a plurality of groups of digital samples to use for calculating estimates of an angle of arrival (AoA) or an angle of departure (AoD) of the received signals;
calculate K estimates of AoA or AoD based on the determined groups of digital samples, wherein K is an integer greater than N, and each of the K estimates corresponds to either: (A) one or more of the received signals transmitted by the single transmit antenna and received by a respective subset of the N receiver antennas; or (B) one or more of the received signals transmitted by a respective subset of the N transmit antennas and received by the single receiver antenna;
select a subset of the calculated estimates of AoA or AoD; and
calculate a measured AoA or AoD based on the selected subset of estimates of AoA or AoD.

2. The receiver circuit of claim 1, wherein the controller is configured to determine each particular group of digital samples based on characteristics of a corresponding set of receive antennas or set of transmit antennas used for generating the particular group of digital samples.

3. The receiver circuit of claim 2, wherein a first set of receive or transmit antennas corresponding with a first group of digital samples includes a first particular antenna, and a second set of receive or transmit antennas corresponding with a second group of digital samples includes the first particular antenna.

4. The receiver circuit of claim 3, wherein each set of receive or transmit antennas has no other antennas therebetween.

5. The receiver circuit of claim 3, wherein at least one set of receive or transmit antennas has one or more other antennas therebetween, wherein the one or more other antennas are not included in the at least one set.

6. The receiver circuit of claim 1, wherein the controller is configured to calculate an estimate of AoA or AoD based on each of the groups of digital samples.

7. The receiver circuit of claim 1, wherein the controller is configured to select the subset of calculated estimates of AoA or AoD by using a clustering algorithm to distinguish reliable ones of the K estimates from outliers of the K estimates.

8. The receiver circuit of claim 1, wherein one of:
A) each digital sample is one of a number of digital samples generated based on the signals transmitted by one of the transmit antennas of the transmitter circuit over a period of time, and
B) each digital sample is one of a number of digital samples generated based on the signals received by one of the receiver antennas over a period of time.

9. The receiver circuit of claim 1, wherein the signals are transmitted by the single transmit antenna of the transmitter circuit and are received by the plurality of receive antennas of the receiver circuit.

10. The receiver circuit of claim 1, wherein the signals are transmitted by the plurality of transmit antennas of the transmitter circuit and are received by the single receive antenna of the receiver circuit.

11. A method of using a receiver circuit, the method comprising:
at one or more receiver antennas of the receiver circuit, receiving a plurality of signals transmitted from a transmitter circuit with one or more transmit antennas, such that the plurality of signals is either transmitted from a single transmit antenna and received by N receiver antennas, or transmitted by N transmit antennas and received by a single receiver antenna;
with at least one RF chain, generating a plurality of digital samples based on the received signals; and
with a controller:
determining a plurality of groups of digital samples to use for calculating estimates of an angle of arrival (AoA) or an angle of departure (AoD) of the received signals;
calculating K estimates of AoA or AoD based on the determined groups of digital samples, wherein K is an integer greater than N, and each of the K estimates corresponds to either: (A) one or more of the received signals transmitted by the single transmit antenna and received by a respective subset of the N receiver antennas; or (B) one or more of the received signals transmitted by a respective subset of the N transmit antennas and received by the single receiver antenna;
selecting a subset of the calculated estimates of AoA or AoD; and
calculating a measured AoA or AoD based on the selected subset of estimates of AoA or AoD.

12. The method of claim 11, further comprising, with the controller, determining each particular group of digital samples based on characteristics of a corresponding set of receive antennas or set of transmit antennas used for generating the particular group of digital samples.

13. The method of claim 12, wherein a first set of receive or transmit antennas corresponding with a first group of digital samples includes a first particular antenna, and a second set of receive or transmit antennas corresponding with a second group of digital samples includes the first particular antenna.

14. The method of claim 13, wherein each set of receive or transmit antennas has no other antennas therebetween.

15. The method of claim 14, wherein at least one set of receive or transmit antennas has one or more other antennas therebetween, wherein the one or more other antennas are not included in the at least one set.

16. The method of claim 11, further comprising, with the controller, calculating an estimate of AoA or AoD based on each of the groups of digital samples.

17. The method of claim 11, further comprising, with the controller, selecting the subset of calculated estimates of AoA or AoD using a clustering algorithm.

18. The method of claim 11, wherein one of:
A) each digital sample is one of a number of digital samples generated based on information transmitted by one of the transmit antennas of the transmitter circuit over a period of time, and B) each digital sample is one of a number of digital samples generated based on information received by one of the receiver antennas over a period of time.

19. The method of claim 11, wherein the signals are transmitted by the single transmit antenna of the transmitter circuit and are received by the plurality of receive antennas of the receiver circuit.

20. The method of claim 11, wherein the signals are transmitted by the plurality of transmit antennas of the transmitter circuit and are received by the single receive antenna of the receiver circuit.

* * * * *